(12) United States Patent
Howell

(10) Patent No.: US 12,187,418 B2
(45) Date of Patent: Jan. 7, 2025

(54) SCENARIO-BASED CONTROL SYSTEM

(71) Applicant: AIRBUS OPERATIONS LIMITED, Bristol (GB)

(72) Inventor: George Howell, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 269 days.

(21) Appl. No.: 17/788,164

(22) PCT Filed: Dec. 15, 2020

(86) PCT No.: PCT/EP2020/086212
§ 371 (c)(1),
(2) Date: Jun. 22, 2022

(87) PCT Pub. No.: WO2021/130061
PCT Pub. Date: Jul. 1, 2021

(65) Prior Publication Data
US 2023/0022505 A1    Jan. 26, 2023

(30) Foreign Application Priority Data
Dec. 23, 2019 (GB) .................................... 1919189

(51) Int. Cl.
  *B64C 25/42*    (2006.01)
  *B60T 8/174*    (2006.01)
  *G06N 3/02*     (2006.01)

(52) U.S. Cl.
  CPC ............ *B64C 25/426* (2013.01); *B60T 8/174* (2013.01); *G06N 3/02* (2013.01)

(58) Field of Classification Search
None
See application file for complete search history.

(56) References Cited

U.S. PATENT DOCUMENTS 6,114,976 A   9/2000  Vian
6,332,105 B1  12/2001 Calise et al.
(Continued)

FOREIGN PATENT DOCUMENTS

CN   106 649 727    5/2017
WO   2014/009031    1/2014
(Continued)

OTHER PUBLICATIONS

Jiao et al., "Fault Propagation of Aircraft Avionics System Based on SDG", 2020 Chinese Control And Decision Conference, Aug. 11, 2020, 4041-4045 (Year: 2020).*
(Continued)

*Primary Examiner* — Todd Melton
*Assistant Examiner* — Sarah A. Mueller
(74) *Attorney, Agent, or Firm* — Nixon & Vanderhye P.C.

(57) ABSTRACT

An aircraft control system (100) including an input interface (102), an output interface (114) and a processing engine (108) having a classifier (110) that applies input data (104) generated by the input interface (102) to generate output control data (112). The classifier (110) has a plurality of parameters which represent a control policy for operating the aircraft (800). The output interface (114) generates control outputs to control the aircraft (800) based on the output control data (112). A machine learning system (900) for training the classifier (110) including an environment (902), a pathway evaluation engine (904), storage (906), and a training engine (908). The machine learning system (900) generates training data (912) by selecting a pathway representing an operating procedure using the pathway evaluation engine (904). The training engine (908) trains the classifier (110) using the training data (912).

16 Claims, 10 Drawing Sheets

(56) References Cited

U.S. PATENT DOCUMENTS

| | | | |
|---|---|---|---|
| 6,751,529 B1 | 6/2004 | Fouche | |
| 10,032,111 B1* | 7/2018 | Bertram | G09B 9/16 |
| 11,360,476 B1* | 6/2022 | Greve | B64D 43/00 |
| 2013/0138332 A1 | 5/2013 | Johnson et al. | |
| 2018/0322365 A1 | 11/2018 | Yehezkel Rohekar | |
| 2019/0033861 A1 | 1/2019 | Groden et al. | |
| 2019/0172361 A1 | 6/2019 | Schwindt | |
| 2019/0225346 A1 | 7/2019 | Calmels et al. | |
| 2021/0001823 A1* | 1/2021 | Georgin | B60T 8/1703 |

FOREIGN PATENT DOCUMENTS

| | | |
|---|---|---|
| WO | 2016/087949 | 6/2016 |
| WO | 2018/117872 | 6/2018 |

OTHER PUBLICATIONS

Myslitski et al., "Network graph transformation providing fast calculation of paths for resilent routing", 2016 8th International Workshop on Resilient Networks Design and Modeling, Sep. 13-15, 2016, 238-244 (Year: 2016).*

International Search Report for PCT/EP2020/086212 dated Mar. 23, 2021 (5 pages).

Written Opinion of the ISA for PCT/EP2020/086212 dated Mar. 23, 2021 (7 pages).

\* cited by examiner

SCENARIO-BASED CONTROL SYSTEM

RELATED APPLICATION

This application is the U.S. national phase of International Application PCT/EP2020/086212, filed Dec. 15, 2020, which designated the U.S. and claims priority to United Kingdom patent application GB 1919189.9, filed Dec. 23, 2019, the entire contents of each of which are hereby incorporated by reference.

TECHNICAL FIELD

The present invention relates to a control system for an aircraft. In particular, but not exclusively, the present invention relates to an aircraft control system comprising a classifier.

BACKGROUND

Aircraft typically comprise a multitude of systems, the complexity of which is increasing. Developing aircraft control systems to automatically operate parts of an aircraft generally involves a considerable amount of time and planning. Rules governing the operation of an aircraft control system in a range of scenarios are devised and coded into the aircraft control systems. Alternative aircraft control systems which can alleviate this development burden, and which are designed to operate in scenarios beyond those envisaged during the development phase are desirable.

SUMMARY

A first aspect of the present invention provides an aircraft control system comprising: an input interface for receiving aircraft operating inputs and generating input data representing an operating state of an aircraft; a processing engine comprising a classifier having a plurality of parameters which are adapted to represent a control policy for operating the aircraft, the processing engine being arranged to apply the input data to the classifier to generate control output data; and an output interface for generating control outputs from the control output data to control the aircraft.

This may allow at least some functions within the aircraft to be controlled automatically without requiring direct control from a pilot of the aircraft. Using a classifier may allow complex aircraft systems to be controlled automatically in scenarios which have not been specifically designed into the aircraft control system. In this way, the aircraft control system may operate in a large number of scenarios while relieving the burden on the developers to identify and design for all possible scenarios.

Optionally, the aircraft operating inputs comprise signals from at least one of sensor outputs and user inputs associated with an operating state of the aircraft.

In this way, the aircraft control system may be able to define a scenario based on an operating state of the aircraft and a desired goal to achieve. For example, where the operational capacity of a component is reduced, the aircraft control system may be made aware of this based on received sensor inputs. The user inputs may define the desired operation of the aircraft, for example, increase altitude, apply brakes, alter temperature in the cabin, and other suitable operations.

Optionally, the control policy represents a desired operation of the aircraft under a plurality of scenarios, and the parameters are generated based on training data representing the control policy for each of the plurality of scenarios.

By training the classifier based on a desired control policy represented by the training data, the classifier may act predictably under scenarios used to generate the training data. Further the classifier may be able to suitably estimate the desired control policy in scenarios outside of the plurality of scenarios under which it has been trained.

Optionally, the training data is generated by selecting an operating procedure for the aircraft control system for each of the plurality of scenarios.

Selecting an operating procedure for the scenario may provide certainty in the way in which the aircraft control system will operate under a given scenario. The selected operating procedure can be reviewed and assessed to determine its suitability for training the classifier in the aircraft control system.

Optionally, selecting an operating procedure for a said scenario comprises: determining at least one target outcome measure for the said scenario; generating a plurality of operating procedures for the said scenario based on an environment representing at least part of the aircraft; determining a plurality of outcome measures based on the plurality of operating procedures; and selecting an operating procedure based at least on a comparison of the at least one target outcome measure with the plurality of outcome measures.

Selecting an operating procedure from a plurality of operating procedures based on a comparison of an outcome measure may provide an unbiased approach to selecting a preferred operating procedure. Generally, operating procedures are manually generated based on heuristic approaches to achieving specific goals. By selecting an operating procedure based on explicit predetermined outcome measures, the operating procedure which is selected may involve steps which a developer would not conceive of.

Optionally, the environment representing the at least part of an aircraft is dependent on the said scenario.

In this way, the environment may reflect specific scenarios where certain pieces of equipment are not operable and/or where certain operating procedures are explicitly disallowed. By modifying the environment in this way, less time and computing power may be spent generating operating procedures which are not viable or suitable to the specific scenario and evaluating their respective outcome measures.

Optionally, the environment comprises a graph model representing the at least part of an aircraft, the graph model comprising a plurality of nodes and a set of directed edges connecting the plurality of nodes, the plurality of nodes comprising a start node and at least one end node, and the plurality of operating procedures are generated by determining pathways in the graph model from the start node to at least one end node.

Using a graph model to represent the at least part of an aircraft provides an efficient way of representing a complex system. The graph model also allows functional interrelations between different components in the aircraft to be accurately modelled and analysed.

Optionally, the plurality of nodes comprises a first subset of nodes each representing a piece of equipment being operated in the least part of an aircraft and a second subset of nodes each representing a manner in which a piece of equipment is operated in the at least part of an aircraft.

The operation of some equipment in the at least part of an aircraft may be performed via the operation of multiple other pieces of equipment. Nodes in the second subset of nodes may therefore represent a higher complexity of operation than nodes in the first subset of nodes. In this way, the graph model may be simplified. Where the aircraft control systems are complex, this simplification may allow the graph model to feasibly represent these complex systems so that operating procedures can be generated and evaluated.

Optionally, selecting an operating procedure based at least on a comparison of the at least one target outcome measure with the plurality of outcome measures comprises: selecting a subset of the plurality of operating procedures based on the comparison of the at least one target outcome measure with the plurality of outcome measures; generating a further plurality of operating procedures based on the subset of the plurality of operating procedures; determining a further plurality of outcome measures from the further plurality of operating procedures; and selecting an operating procedure based at least on a comparison of the at least one target outcome measure with the further plurality of outcome measures.

Generating a plurality of operating procedures and simply selecting between them is sufficient for some aircraft system. However, in other aircraft systems, the complexity of the aircraft system makes it unlikely that a desired or optimum control policy will be represented in the plurality of operating procedures, especially if the plurality is relatively small. In these cases, an iterative process may be performed in which a subset of the plurality of operating procedures which perform well, may be selected and the process of generating and selecting an operating procedure based on this may be reperformed. In this way the further plurality of operating procedures are generated based on some prior knowledge such that they are more likely to comprise an operating procedure which represents the desired control policy. The first plurality of operating procedures which are generated may be defined and/or generated according to a respective set of parameter values. For example, the parameter values may represent a function used to generate some of the plurality of operating procedures.

Optionally, the aircraft control system is a braking control system.

Braking control systems may be ideal candidates for being operated using a classifier as described above. Braking control systems involve the operation of many components which are controlled and monitored by avionic equipment. Braking control systems also comprise a large number of redundancies and fail-safes and therefore identify and designing a braking control system to operate efficiently in a large number of scenarios is difficult and laborious.

Optionally, the aircraft control system is a braking control system and the graph model represents actuation equipment and avionic equipment in the braking control system.

Representing both the actuation and avionic equipment in the braking control system may allow the interrelations between actuation and avionic equipment to be modelled and evaluated when determining operating procedures. Further, the operating procedures for a braking control system may be dependent on both the actuation equipment which is operated, and the avionic equipment used to monitor and operate it said equipment. The avionic and actuation equipment are often designed with a plurality of fail safes and redundancies, and so evaluating operating procedures which take into account these factors may allow the aircraft control system to operate more accurately and efficiently.

Optionally, the first subset of nodes each represent operation of actuation equipment in the braking control system.

Certain actuation equipment may have a simple operation and where the operation of said actuation equipment occurs early in the operating procedure it can be readily modelled as a node in the graph model.

Optionally, at least one node in the second subset of nodes represent a manner in which a brake is operated.

The manner in which a brake is operated may be a complex process, where brakes can be operated in any of a plurality of modes, and caused to operate by the control of any of a plurality of avionic equipment. Rather than specify, at each node, a specific piece of equipment which is used to operate the brake in a particular manner, a single node may be used, wherein that node itself is associated with a subroutine.

Optionally, a manner in which the brake is operated includes one or more of: specifying avionic equipment used to operate said brake; operating the brake in an environmental compensation mode; and operating the brake not in an environmental compensation mode.

In this way, functions in the braking control system which require the operation of a plurality of different pieces of equipment may be simplified in the graph model, thereby making the evaluation of operating procedures represented by pathways in the graph model feasible.

Optionally, the input interface is configured to receive inputs from one or more of: a power supply for operating the brake; at least one of a plurality of coils used to operate respective components for actuation equipment in the braking control system; a pressure sensor in the braking control system; avionic equipment in the braking control system; and a wheel speed sensor for monitoring braking.

Receiving inputs from this equipment in the braking control system may allow an operating state of the aircraft to be accurately constrained. In this way, the control outputs which are generated may be able to effectively operate the brakes in a desired manner in a large number of scenarios.

A second aspect of the invention provides a machine learning system for training a classifier of an aircraft control system, the machine learning system comprising: an environment comprising a graph model representing at least part of an aircraft, the graph model having a plurality of nodes and a set of directed edges connecting the plurality of nodes, the plurality of nodes including a start node and at least one end node; a pathway evaluation engine adapted to: obtain data representing at least one target outcome measure for a given scenario; select a pathway from the start node to at least one end node based on a comparison of at least one outcome measure determined for the selected pathway and the at least one target outcome measure, the pathway representing an operating procedure for the aircraft control system; and generate training data representing a control policy for the given scenario based on the selected pathway; storage for storing the training data to be used to train a classifier of an aircraft control system; and the machine learning system comprises a training engine adapted to train the classifier of the aircraft control system using the training data to generate control output data according to the control policy using input data representing an operating state of an aircraft.

Selecting an operating procedure from a plurality of operating procedures based on a comparison of an outcome measure with a target outcome measure rather than by developing rules based on expert knowledge, may allow operating procedures which have improved characteristics to be identified. Due to the increasing complexity of aircraft, there may be new and different ways of performing certain functions which are not obvious to developers who build the aircraft control systems. This generation and evaluation of operating procedures by the machine learning system is made feasible by the representation of the at least part of an aircraft system using a graph model.

Optionally, selecting a pathway comprises: generating a first plurality of pathways from the start node to at least one end node; evaluating a second plurality of pathways from the start node to at least one end node, wherein the second plurality of pathways are generated based on a selected subset of the first plurality of pathways; and selecting a pathway from the second plurality of pathways based on a comparison of at least one outcome measure determined for the selected pathway and the at least one target outcome measure.

By iteratively generating more pathways using the knowledge learned from previous iterations, the further pathways which are generated may be closer to a desired operation of the aircraft control system. Where the aircraft are complex, unless a vast number of pathways are generated in the first instance, it is unlikely that an optimum solution will be found in the first attempt. By generating the second plurality of pathways using a subset of the first plurality of pathways, the machine learning system may efficiently generate pathways which are more likely to represent the desired control policy for the given scenario.

Optionally, the selected subset of the first plurality of pathways are selected based on a comparison of outcome measures determined for the first plurality of pathways with the at least one target outcome measure.

In this way the machine learning system may use a more promising subset of the first plurality of pathways, and thereby may more efficiently converge on an operating procedure representing the desired control policy for the given scenario.

A third aspect of the invention provides an aircraft comprising an aircraft control system as described above.

A fourth aspect of the invention provides a method for training a classifier of an aircraft control system, the method comprising: generating training data representing a control policy for a plurality of scenarios; and training a classifier of the aircraft control system to generate control output data according to the control policy using input data representing an operating state of an aircraft; wherein generating training data comprises, for each of the plurality of scenarios: representing at least part of an aircraft using a graph model comprising a plurality of nodes and a set of directed edges connecting the plurality of nodes, the plurality of nodes comprising a start node and at least one end node; obtaining data representing at least one target outcome measure for the scenario; and selecting a pathway in the graph model from the start node to at least one end node based on a comparison of at least one outcome measure determined for the selected pathway and the at least one target outcome measure, wherein the pathway represents an operating procedure for the aircraft control system.

Selecting an operating procedure from a plurality of operating procedures based on a comparison of an outcome measure with a target outcome measure rather than by developing rules based on expert knowledge, may allow operating procedures which have improved characteristics to be identified. Due to the increasing complexity of aircraft, there may be new and different ways of performing certain functions which are not obvious to developers who build the aircraft control systems. This generation and evaluation of operating procedures by the machine learning system is made feasible by the representation of the at least part of an aircraft system using a graph model.

BRIEF DESCRIPTION OF THE DRAWINGS

Embodiments of the invention will now be described, by way of example only, with reference to the accompanying drawings, in which.

DETAILED DESCRIPTION

Figure 1:
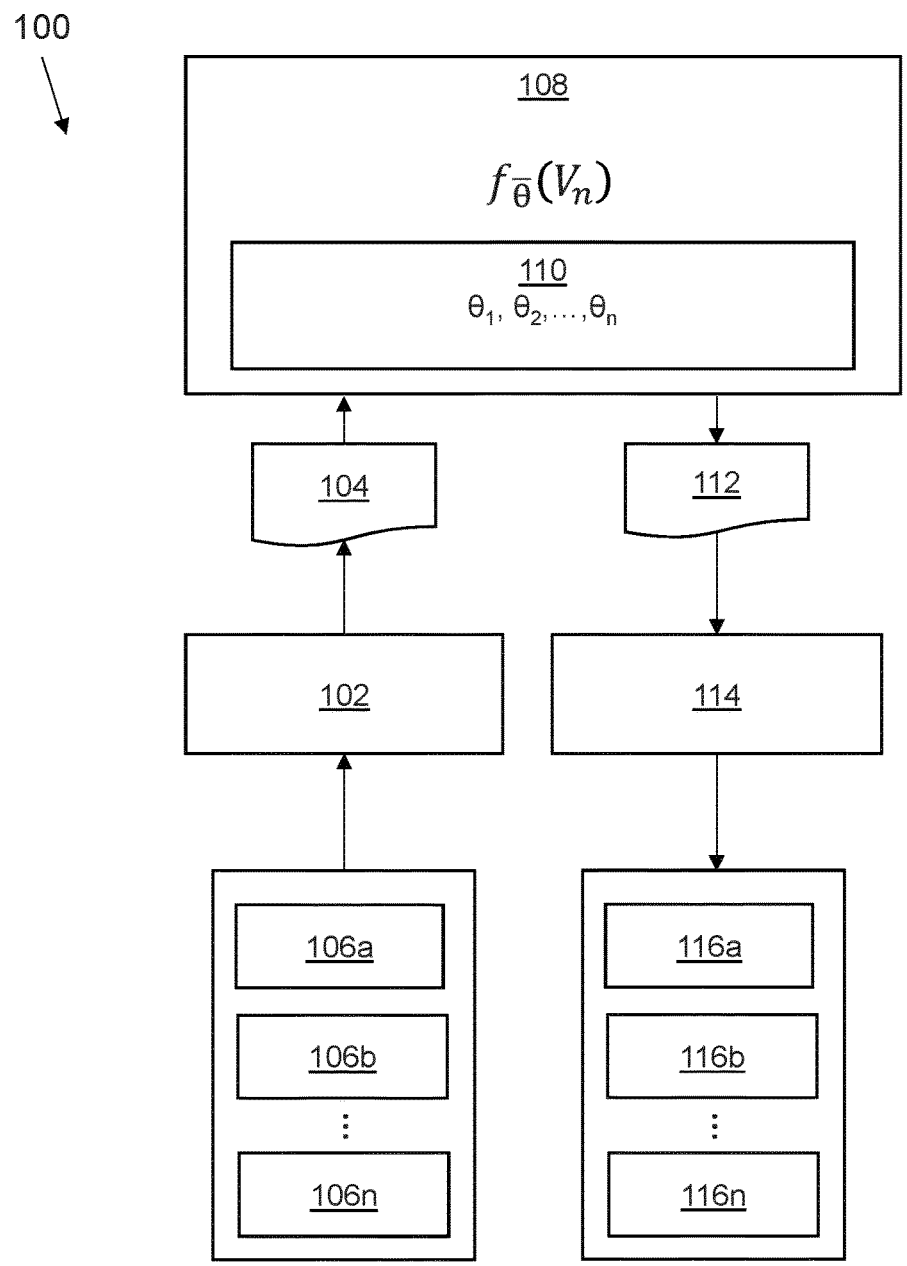
FIG. 1 is a block diagram of an aircraft control system according to an example.

Aircraft systems are becoming increasingly more complex. With advances in technology, the capabilities of aircraft are increasing. As aircraft systems grow in complexity, automation is used often to alleviate an increasing burden on operators of these aircraft, such as pilots. However, developing systems to provide the automation is commensurately difficult.

Generally, when designing an aircraft control system, developers are provided with a specification. The specification defines predetermined scenarios and desired operating procedures for the aircraft control system in these predetermined scenarios. The developers will then create an aircraft control system which is designed to operate in compliance with the specification. Where scenarios that are not foreseen in the specification arise, the pilots are able to initiate operations manually in the aircraft and/or override the aircraft control system. Nevertheless, it would be desirable to have an aircraft control system that is able to apply artificial intelligence to react appropriately to scenarios that are beyond the scope of the design specification.

In a given scenario there are a plurality of ways in which the aircraft control system could operate to adequately control the aircraft. However, developers are generally more likely to design the aircraft control system to operate the aircraft in a manner dictated by their experience. Due to the increasing complexity of aircraft, in some scenarios there may be unforeseen ways to operate the aircraft, which may be desirable. For example, there may be ways of performing routines in the aircraft which require the operation of fewer components, are more efficient, and provide other beneficial characteristics. Therefore, it would be desirable to provide an aircraft control system which is able to identify valid operating procedures for controlling the aircraft which may not have been foreseen by the developers.

Generally, in a given scenario, defined by some aircraft operating inputs, the aircraft control system should be able to identify an operating procedure for achieving a desired result. Operating procedures comprise a list of tasks, or operations, which are performed for a given scenario. The list of tasks includes the operation of specific equipment such as actuators (including valves operating coils and/or pumps), and initiating sensor readings, and other equipment. In some cases, the operating procedures specify a particular manner in which specific equipment is operated. Where there are dependencies between certain tasks, in other words where operating a piece of equipment is dependent on the operation of another piece of equipment, the operating procedure may comprise an ordered list of tasks.

Certain examples described herein relate to controlling an aircraft by using a classifier to determine an operating procedure for controlling the aircraft. The aircraft control system is adapted to process received input data using a classifier to generate control outputs for operating the aircraft. The classifier has a plurality of parameters which are adapted to represent a control policy which is based on a desired operation of the aircraft. Using a classifier in the aircraft control system allows the aircraft control system to produce suitable control outputs in a wide range of scenarios potentially even beyond those initially devised by the developers of the aircraft control system.

Certain examples described herein provide a machine learning system for training a classifier for controlling an aircraft. The machine learning system is adapted to evaluate a plurality of operating procedures in each of a plurality of scenarios and to train the classifier based on the results. Rather than developers having to manually devise operating procedures they may instead specify a scenario and a desired result. The machine learning system is then adapted to evaluate possible operating procedures and to determine a desired one which can be used to train the classifier. This may allow the machine learning system to devise operating procedures which may be new and non-intuitive to developers. In this way, the machine learning system may identify more-optimum operating procedures and increase the automation capability of the aircraft control system. Multiple measures may be used to constrain a desired operating procedure in each of a plurality of scenarios. In this way, the developers may still exercise control over operating procedures which are produced and the degree to which they exercise this control is determined by the number of and specificity of the measures they use. Further, the developers may review the operating procedures generated by the machine learning system before using them to train the classifier in the aircraft control system.

FIG. 1 shows an example aircraft control system 100. The aircraft control system 100 is a combination of hardware and software installed in an aircraft and used to control the aircraft. The aircraft control system 100 comprises computing equipment for monitoring the aircraft and processing data to produce control signals. The computing equipment is connected to other physical equipment in the aircraft including processors, actuators, sensors, aircraft control equipment for the pilots, and any other physical equipment which is used to control the aircraft.

The aircraft control system 100 comprises an input interface 102 for receiving aircraft operating inputs such as sensor outputs and user inputs associated with an operating state of the aircraft, data and/or information from other processing systems and/or physical equipment (collectively shown as 106a-106n). The input interface 102 comprises suitable signal processors, for instance, for converting analogue and/or digital inputs from physical equipment into data for processing. The input interface 102 receives the aircraft operating inputs and generates input data 104 representing an overall operating state of the aircraft.

According to the present example, the equipment 106a to 106n shown in FIG. 1 includes, but is not limited to, a variety of sensors, and aircraft controls.

The sensors may include a mixture of environmental sensors and equipment sensors. Environmental sensors include any of thermometers, hygrometers, altimeters, barometers, and other environmental sensors arranged to monitor specific equipment and/or regions in the aircraft or a general state of the aircraft. The equipment sensors are arranged to monitor operating states of equipment in the aircraft, which may include detecting faults in equipment of the aircraft. Although the aircraft operating inputs in this example comprise signals from sensor outputs and user inputs, it is to be appreciated that the aircraft operating inputs may come from just one of these sources.

An operating state of the aircraft may comprise one or more of environmental conditions, operating states of specific equipment within the aircraft, a goal to be achieved, and other suitable information. A goal to be achieved may be determined by an input provided by the pilots, for example, to apply the brakes, to increase throttle, etc. Alternatively, the goal to be achieved may be an automatic goal generated in response to a change in state of the aircraft, for example a reduction in altitude, a reduction in engine power, etc. To this end, the input data 104 may comprise a plurality of variables indicative of the operating state of the aircraft.

The input data 104 represents an instantaneous state of the aircraft at a given moment. Alternatively, the input data 104 may represent a dynamic state of the aircraft, wherein the input data 104 indicates a trend in one or more variables which represent sensor outputs and/or user inputs. The input data 104 may be generated based on a subset of the plurality of aircraft operating inputs provided to the input interface 104 and may be dependent on a change of one or more specific aircraft operating inputs. In this case, the aircraft operating inputs are continually provided to the input interface 102 and input data 104 is generated in response to a change in one or more of the aircraft operating inputs.

A processing engine 108 in the aircraft control system 100 comprises a classifier 110 having parameters $\theta_1$ to $\theta_n$ which are adapted to represent a control policy $f_{\overline{\theta}}(V_n)$ for operating the aircraft. The processing engine 108 is arranged to apply the input data 104 representing the operating state of the aircraft to the classifier 110 to generate control output data 112. An output interface 114 is used to generate control outputs from the control output data 112 to control the aircraft. The control outputs are used to operate the equipment 116a to 116n in the aircraft. The output interface 114 is capable of producing both analogue and digital signals for control outputs using any suitable number and combination of signal processors. The analogue and digital signals are then used to operate relevant equipment such as actuators, pumps, and to instruct processors and the like.

In an example, the processing engine 108 is implemented using at least one processor and at least one memory. The at least one processor used to implement the processing engine may include any one or more of a central processing unit (CPU), a graphics processing unit (GPU), an application specific instruction set processor (ASIP), or any other suitable processing device. The at least one memory may be any suitable combination of volatile and non-volatile memories including random-access memory (RAM), read-only memory (ROM), synchronous dynamic random-access memory (SDRAM), or any other suitable type of memory. The at least one memory comprises instructions which, when executed by the at least processor, cause the processor to obtain the input data 104 and apply the input data 104 to the classifier to generate control output data 112. The at least one memory stores the parameters $\theta_1$ to $\theta_n$ for use in processing the input data 104. The classifier 110 which is used may be any suitable classifier, some examples of which include: decision trees, naïve bayes classifiers, artificial neural networks, and k-Nearest Neighbour classifiers.

Figure 2:
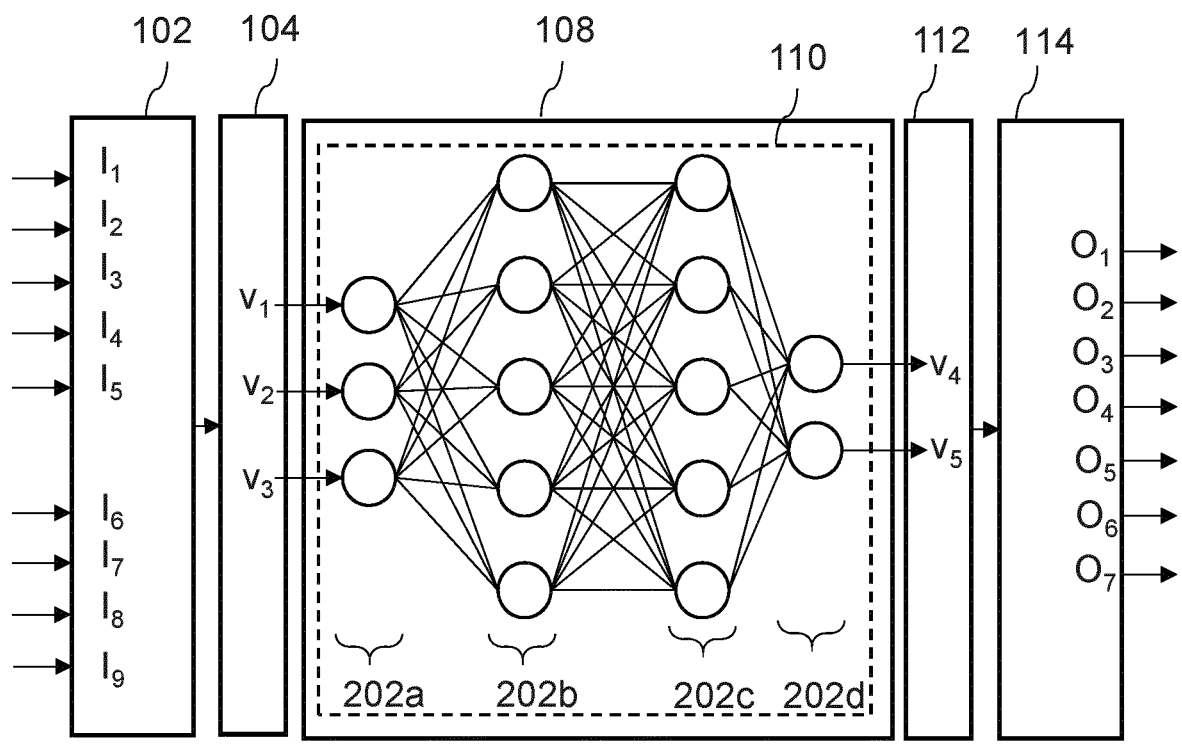
FIG. 2 is a schematic diagram of an aircraft control system according to an example wherein the classifier comprises a neural network.

FIG. 2 shows an example wherein the classifier 110 comprises a neural network having an input layer 202a, two hidden layers 202b and 202c, and an output layer 202d. In the example shown in FIG. 2, aircraft operating inputs $I_1$ to $I_9$ are received by the input interface 102. The input interface 102 generates input data 104 comprising variables $V_1$ to $V_3$ which are applied to the neural network by introducing them at the input layer 202a and processing them according to the parameters $\theta_1$ to $\theta_n$ of the neural network. The variables $V_1$ to $V_3$ may for instance include scalar values or vectors. According to this example, the parameters $\theta_1$ to $\theta_n$ are the weights of nodes defining the neural network and which are used to process the input data 104. Although two hidden layers 202b and 202c are shown in this example, the neural network may comprise any suitable number of hidden layers for performing the functions described herein. Neural Networks have been found to be particularly suitable for the present application in aircraft control systems 100 due to their ability to process higher dimensional data as inputs, and due to the high number of possible scenarios and operating procedures in aircraft.

Values $V_4$ and $V_5$ are extracted from the output layer 202d of the neural network and used to generate control output data 112. The control output data 112 is then used to generate control outputs $O_1$ to $O_7$ at the output interface 114, which are used to control the aircraft, in particular by operating equipment 116a to 116n.

The control policy $f_{\bar{\theta}}(V_n)$ represents a desired operation of the aircraft under a plurality of scenarios. The parameters $\theta_1$ to $\theta_n$ are generated based on training data representing the control policy $f_{\bar{\theta}}(V_n)$ for each of the plurality of scenarios. By training the classifier 110 using training data which represents the control policy $f_{\bar{\theta}}(V_n)$ the classifier 110 is able to be trained to act suitably under the plurality of scenarios. In an example, the training data is generated by selecting an operating procedure for the aircraft control system 100 for each of the plurality of scenarios.

Using a classifier 110 which is trained from this data may also allow the classifier 110 to generate output control data 112 which estimates a desired operation of the aircraft in scenarios which are not defined in the training data. Thus, the aircraft control system 100 may be able to control the aircraft in wider range of scenarios than other, known aircraft control systems.

Figure 3:
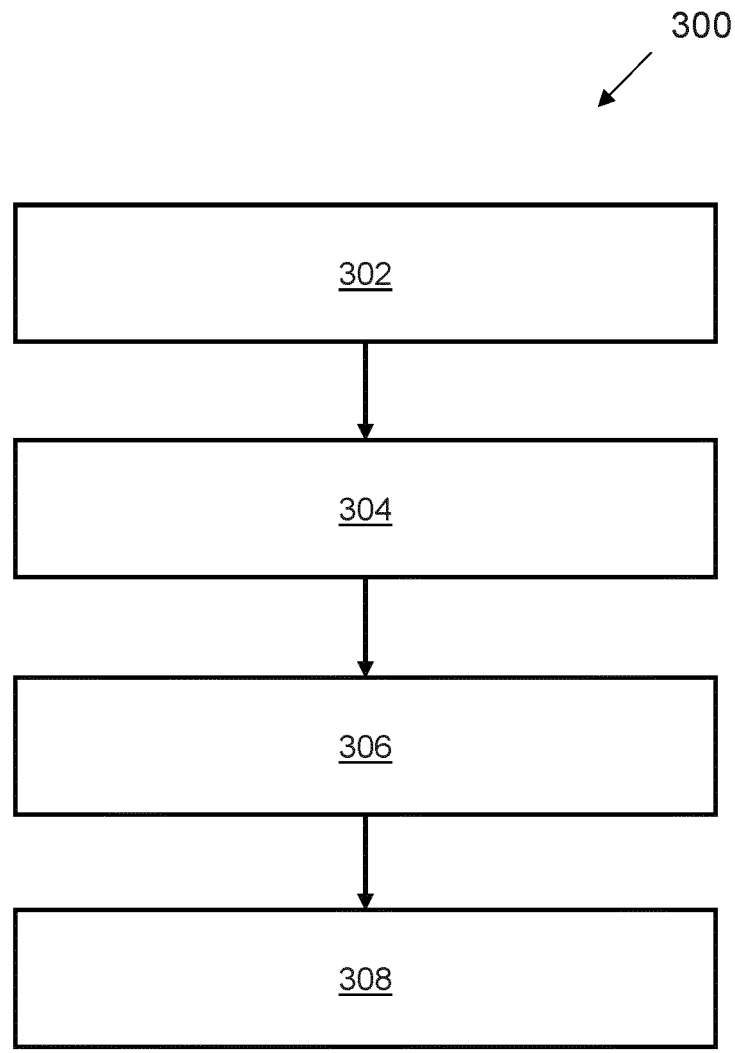
FIG. 3 is a flow chart illustrating a process for selecting an operating procedure according to an example.

As the parameters $\theta_1$ to $\theta_n$ are trained using the training data, the control policy $f_{\bar{\theta}}(V_n)$ is dependent on the operating procedures which are selected for each scenario. In an example, there are a plurality of different operating procedures for each scenario and one operating procedure is selected from the plurality based on how well it satisfies the desired operation of the aircraft. Steps for selecting an operating procedure in a given scenario are illustrated by a flow chart 300 in FIG. 3.

At block 302 of the flow chart 300, at least one target outcome measure is determined for the scenario. For example, for a scenario comprising regulating the temperature of a cabin, the at least one target outcome measure may include the desired temperature of the cabin and may also include a measure relating to power used to control the temperature in the cabin. Another example of a scenario is where the aircraft has touched-down during landing, and the brakes are to be applied. In this case, the at least one target outcome measure may include an amount of braking force applied to achieve braking safely and within a shortest desirable distance, taking account of an amount of deceleration that is comfortable to passengers, a temperature limit for certain components in the brakes, and any other related measure which may be applicable in this case.

At block 304, a plurality of operating procedures is generated for the scenario. These operating procedures are based on an environment representing at least part of an aircraft. The environment may be a simulated version of the aircraft, or at least part of it, with which operating procedures can be generated and assessed. The environment represents a plurality of components or equipment in the aircraft and ways in which they can be operated to control the aircraft. In some cases, the environment represents a specific system within the aircraft such as a braking system, a fuel system or an environmental control system for the cabin. An example of an environment will be described in detail hereafter with reference to FIGS. 4 to 7.

The number of operating procedures which are generated for each scenario may depend on the complexity of the environment and the specific scenario which is being assessed. In the present example of a general case, a suitable number of operating procedures is 1000. However, there may be fewer operating procedures, such as 100 or even 10, or more, such as 10000. In some examples, techniques are applied to limit the total number of operating procedures which are used. Such techniques include producing a first set of operating procedures, and subsequently producing a second set of operating procedures based on the results of the first set. This will be described further with reference to FIG. 9.

At block 306, a plurality of outcome measures are determined based on the plurality of generated operating procedures, at least one outcome measure being determined for each operating procedure. The number of outcome measures depends on the scenarios and the aircraft control system to be operated. Determining the at least one outcome measure includes simulating a result of performing the respective operating procedure in the aircraft for the scenario and assessing the result. The environment may include a feedback mechanism wherein the operating procedures can be applied to the environment and at least one outcome measure per operating procedure is determined by the feedback mechanism.

At block 308, an operating procedure is selected based at least on a comparison of the at least one target outcome measure with the plurality of outcome measures. In this way, the operating procedure which is selected satisfies the at least one target outcome measure and so represents a desired operation of the aircraft. Once an operating procedure has been selected for a given scenario using the graph model 400, training data may be generated and used to train the classifier 110.

The target outcome measures which are used to assess the performance of the operating procedures influence the way in which the aircraft is operated. A human developer of the aircraft control system may have a preconception regarding what a particular operating procedure should include, and this will influence their decisions when designing said operating procedure. However, by selecting a target outcome measure, or several, and performing an assessment of a plurality of operating procedures based on this, certain operating procedures, of which the human developer would not have conceived, may be evaluated and even selected. In some examples, a selected operating procedure is reviewed by a human operator and/or developer in order to determine its suitability before being used to train the classifier 110 in the aircraft control system 100.

Figure 4:
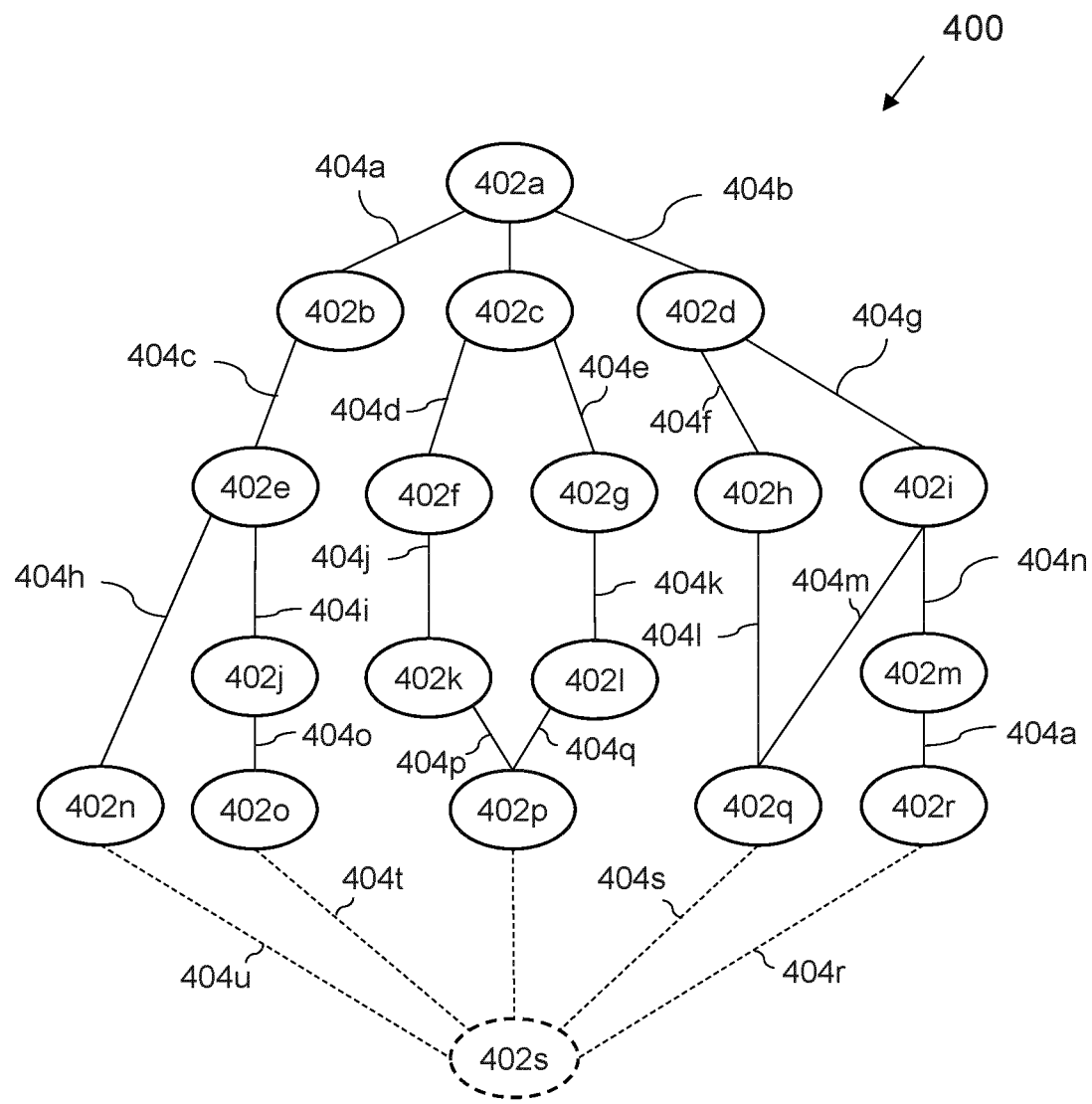
FIG. 4 is a schematic diagram of a graph model representing at least part of an aircraft according to an example.

FIG. 4 shows an example of at least part of an environment. The environment comprises a graph model 400 representing the at least part of an aircraft. The graph model 400 comprises a plurality of nodes 402a to 402s and a set of directed edges 404a to 404u connecting the plurality of nodes 402a to 402s. The plurality of nodes 402a to 402s comprises a start node 402a and at least one end node 402n to 402s. In the example shown in FIG. 4 one node 402s is shown in broken lines to indicate that a single end node 402s may be provided. In some examples, different pathways through the graph model 400 may end at respective end nodes 402n to 402r. A common end node 402s can be used to end the pathways through the directed graph 400 at a common point and trigger an evaluation of the performance of the pathways. The plurality of operating procedures is generated by determining pathways in the graph model 400 from the start node 402a to at least one end node 402n to 402s.

The nodes 402a to 402s each represent a step in an operating procedure for controlling the aircraft. In some examples, the plurality of nodes 402a to 402s comprises a first subset of nodes and a second subset of nodes. The nodes in the first subset of nodes each represent a piece of equipment being operated in the at least part of an aircraft. The nodes in the second subset of nodes each represent a manner in which a piece of equipment is operated in the at least part of an aircraft. The operation of some equipment in the aircraft may be simple, for example a binary choice of on or off. Operating this equipment is represented by the first subset of nodes. The operation of other equipment in the aircraft may be more complex, for example involving a more granular choice of operation, and is represented by the second subset of nodes. Representing the equipment in the aircraft in this way in the graph model 400 greatly assists in identifying which potential operating procedures are feasible. If the graph model 400 were to model all equipment used and their interdependencies, then the resulting graph model would be extremely complex, and it may not be practical to identify which potential operating procedures are feasible. The distinction between the first subset and second subset of nodes will be described further with reference to the specific example of FIG. 7.

The environment representing the at least part of an aircraft may be dependent on the scenario which is being evaluated. For example, modifications are made to the environment to represent the scenario. In a scenario which includes a reduction in performance of a specific piece of equipment, the environment may be modified to reflect the reduction in performance of that piece of equipment. In this way, the plurality of scenarios used in the training data can be more complex and involve specific scenarios which go beyond environmental states and goals to be achieved and can involve operating states of equipment in the aircraft.

Depending on the complexity of aircraft, and the respective graph models 400 which represent them, it may not be feasible to evaluate all operating procedures, represented by pathways in the graph models 400. In other words, brute force techniques for evaluating operating procedures would take too long to run and/or require more computing power than is feasible to use. Consequently, techniques to increase the efficiency of the evaluation of operating procedures are utilised in order to allow the application of the present disclosure to large complex aircraft with many systems and subsystems. Selecting an operating procedure is a multistage process which involves refining the operating procedures by iteratively generating pluralities of operating procedures based on a selected subset of operating procedures in a previous plurality.

Starting with a plurality of operating procedures, a subset of this plurality of operating procedures is selected based on a comparison of the at least one target outcome measure with the plurality of outcome measures, for example, the highest performing operating procedures. In other words, this selected subset includes operating procedures which were closest to achieving, or exceeded, the at least one target outcome. A further plurality of operating procedures is generated based on the selected subset of the plurality of operating procedures. Each operating procedure in the selected subset of operating procedures comprises a plurality of operations, each of which is selected from a number of possible operations. When generating the further plurality of operating procedures, some of the operations in the selected subset of operating procedures are replicated in the further plurality of operating procedures. However, the selection of some of the operations are evaluated by selecting alternatives when generating the further plurality of operating procedures. A number of different techniques may be used to perform this evaluation, including metaheuristic optimization algorithms such as genetic algorithms, and heuristic search algorithms such as Monte Carlo Tree Search.

Figure 5:
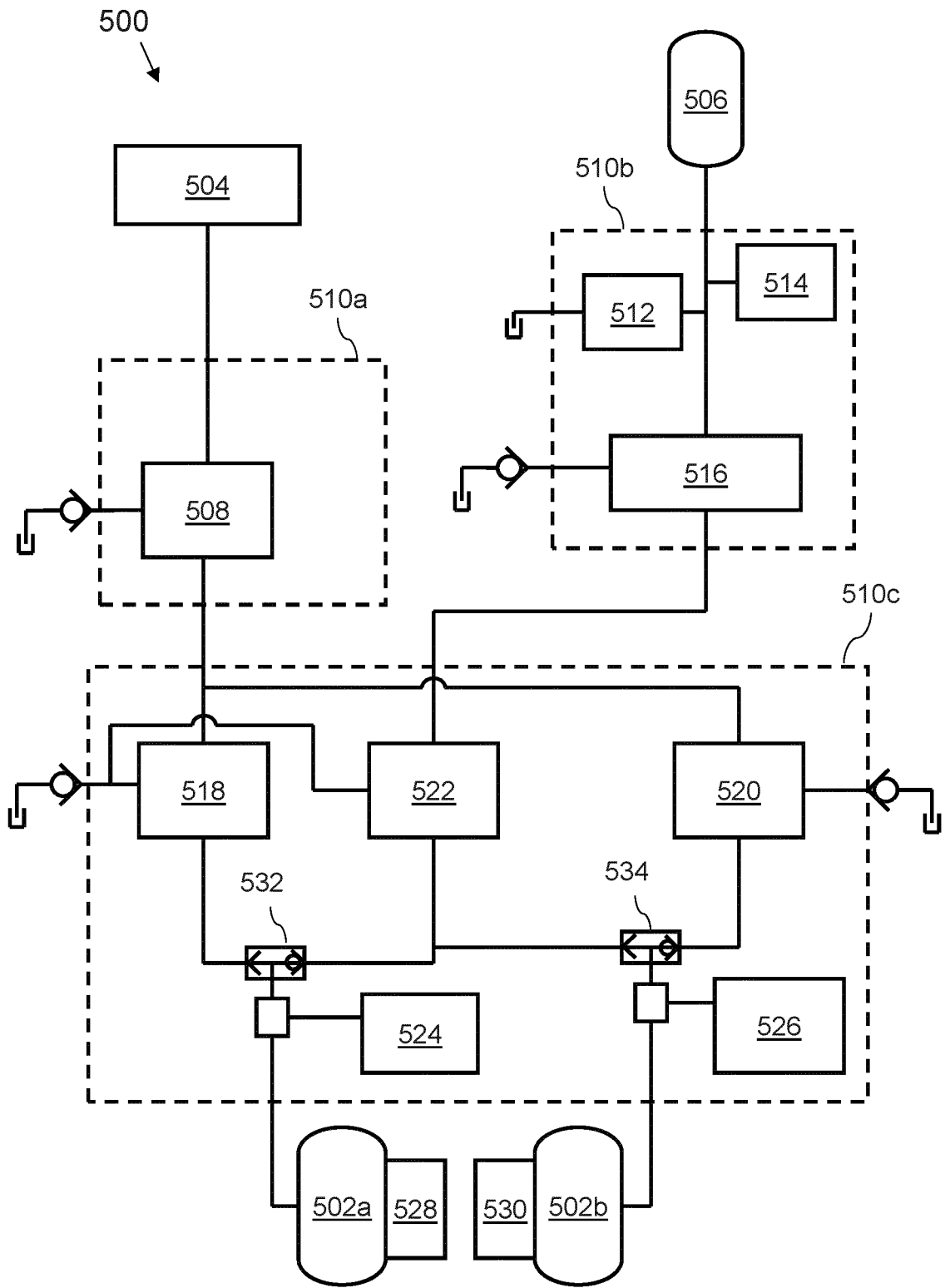
FIG. 5 is a schematic diagram of a hydraulic system of a braking control system according to an example.
Figure 6:
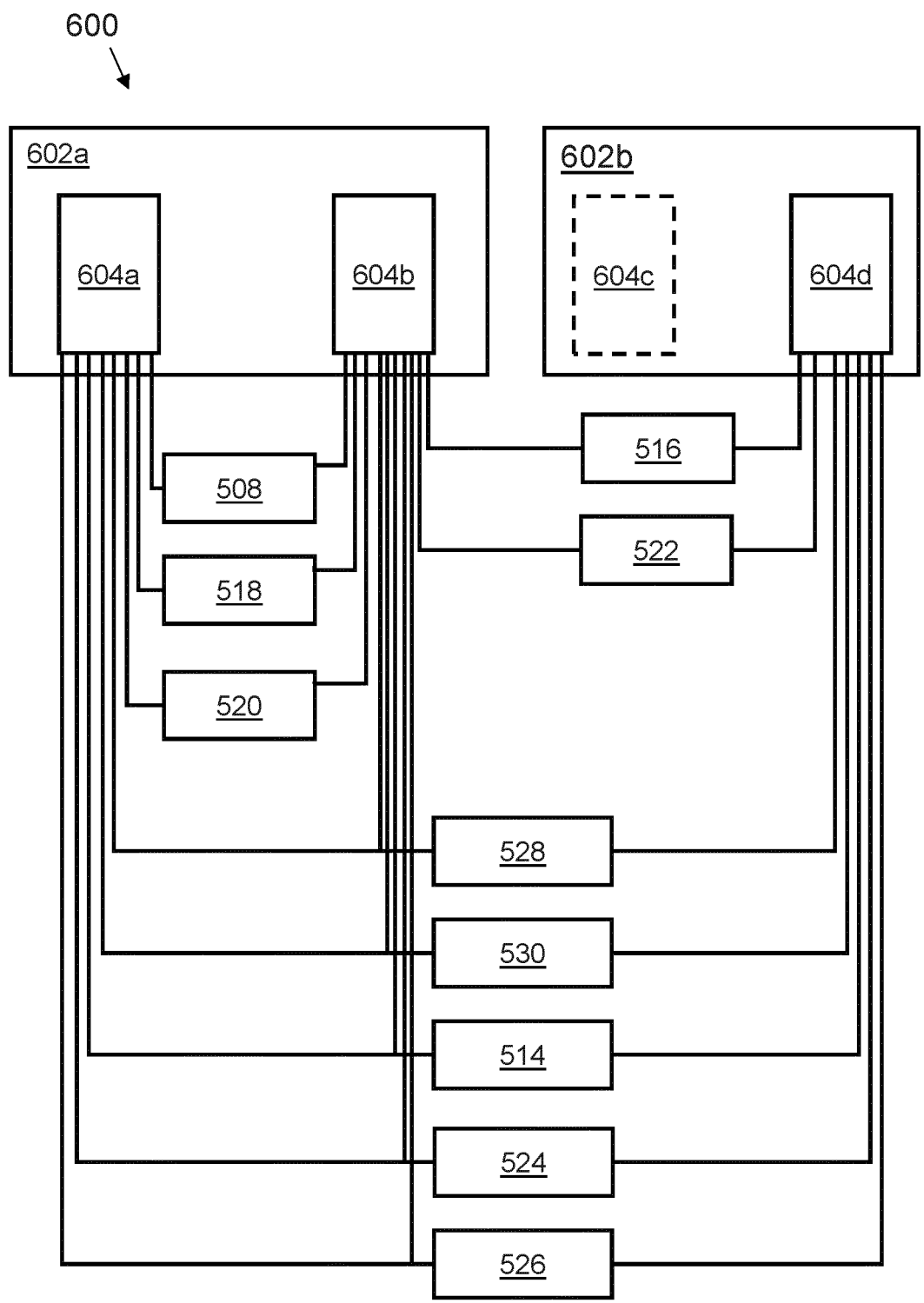
FIG. 6 is a schematic diagram of an avionic system in the braking control system according to an example.

In a specific example of the present disclosure, the aircraft control system is a braking control system. Braking control systems comprise a variety of components including physical actuation equipment and computing hardware. An example of a braking control system is shown in FIGS. 5 and 6. FIG. 5 shows a hydraulic system 500 comprised in the braking control system. FIG. 6 shows an avionic system 600 comprised in the braking control system. In the examples described herein the braking control system is a hydraulic braking control system. However, it will be appreciated that in other examples, the braking control system may be an alternate braking control system, such as an electrical braking system in which the brakes are operated by electrical actuation equipment.

The hydraulic system 500 shown in FIG. 5 comprises components which are operated in order to control the brakes 502a, 502b. The brakes 502a and 502b can be operated either using a primary power supply or an alternative power supply. In this example, the primary power supply is provided by a hydraulic pump 504, and the secondary power supply is provided by a hydraulic accumulator 506. A selector valve 508 selects operation using the primary power supply 504 in a primary selector system 510a. Under normal operation, the primary power supply 504 is used and so the selector valve 508 may be referred to as the normal selector valve 508. The primary selector system 510a may also comprise other components including monitoring equipment (not shown). Operating the normal selector valve 508 comprises providing an electrical signal to a coil which actuates the valve. The normal selector valve 508 may comprise two such coils for redundancy purposes.

The hydraulic accumulator 506 is a pressurised container. When used to operate the brakes 502a and 502b, the pressure which is delivered to the rest of the braking system from the accumulator 506 is monitored and controlled to ensure the safe operation of the brakes 502a and 502b. To this end, there is provided a secondary selector system 510b. The secondary selector system 510b comprises a relief valve 512, to control the pressure of fluid released from the accumulator 506, a pressure transducer 514 for monitoring the pressure from the hydraulic accumulator 506, and a secondary selector valve 516 to select the hydraulic accumulator 506 as the power supply for operating the brakes 502a and 502b.

After the operation of either the normal selector valve 508 or the secondary selector valve 516, power, in the form of pressurised fluid, is provided in the brake operation system 510c. A first servo valve 518 and a second servo valve 520 are used to control the supply of hydraulic fluid from the hydraulic pump 504 to the first 502a and second 502b brakes respectively. A third servo valve 522 is used to control the supply of hydraulic fluid provided by the accumulator 506 to the first 502a and second 502b brakes. The hydraulic system 500 comprises two pressure transducers 524 and 526 for monitoring the pressure of hydraulic fluid being provided to each of the brakes 502a and 502b.

Shuttle valves 532, 534 are included between the first 518, second 520, and third 522 servo valves and the brakes 524, 520 to ensure that the highest-pressure input is fed through to the brakes. The use of shuttle valves prevents the pressurised fluid from the accumulator 506 from being fed back into the primary power supply, and vice versa. In other words, these shuttle valves ensure that fluid delivered from the accumulator goes to the brakes and not backwards through the first 518 and second 520 servo valves.

Two tachometers 528 and 530 are used to monitor the speed of the wheels during braking to provide feedback in the braking control system. It will be appreciated that other components not shown may also be included and used in the hydraulic system 500, such as further sensors, actuators, and the like. It is also to be understood that while specific examples of equipment have been described herein, other equipment may also be used. For example, a wheel speed sensor other than a tachometer may be used to monitor the speed of the wheels during braking. Similarly, other pressure sensors rather than pressure transducers may be used to monitor the pressure in the hydraulic system 500.

In the example shown in FIG. 5, equipment is used to produce at least some of the aircraft operating inputs $I_1$ to $I_9$ which are received at the input interface 102. The input interface 102 is configured to receive inputs from the power supplies 504 and 506 for operating the brakes 502a and 502b, at least one of a plurality of coils used to operate respective components for actuation equipment, pressure sensors, such as 514, 524, and 526, and wheel speed sensors, such as tachometers 528 and 530. It will be appreciated that the input interface 102 may be configured to receive inputs from all of these components or from any subset of these components.

Signals generated by the pressure transducers 514, 524, 526 may be received at the input interface 102 and may be used to determine an operating state of the aircraft. The tachometers 528 and 530 also provide aircraft operating inputs to the input interface 102.

At least some of the aircraft control outputs $O_1$ to $O_7$ are used to control equipment in the hydraulic system 500 such as the selector valves 508, 516 and the servo valves 518 to 522. In an example, aircraft control outputs used to operate the selector valves 508, 516 and the servo valves 518 to 522 are used to deliver power to operate these pieces of equipment. Alternatively, the aircraft control outputs are control signals used to instruct the equipment wherein the equipment comprises its own power supply. Control signals may be analogue or digital signals. The valves 508, 512, 516, 518, 522, and 520 may comprise respective control units configured to operate their respective valve in a predetermined manner based on a received control signal.

The avionic system 600 shown in FIG. 6 comprises two remote braking control units 602a and 602b. These remote braking control units 602a and 602b each comprise memory, in the form of any suitable combination of volatile and non-volatile memory, and at least one processor.

Two remote braking control units 602a and 602b are provided for redundancy purposes, however it will be appreciated that the braking control system may have only one remote braking control unit 602a. The remote braking control unit 602a comprises two modules 604a and 604b which are adapted to control operation of the equipment in the hydraulic system 500. The first module 604a is connected to: primary coils for operating the normal selector valve 508, the servo valves 518, 520, and to the sensor equipment including the tachometers 528, 530, and the pressure transducers 514, 524, 526. The second module 604b is connected to: secondary, or redundant, coils for the normal selector valve 508, the servo valves 518, 520, and to the sensor equipment 528, 530, 514, 524, 526. The second module 604b is also connected to the selector valve 516 for selecting the accumulator 506, and to a primary coil of the servo valve 522. The second remote braking control unit 602b similarly comprises first and second modules 604c and 604d. However, only the connections to the second module 604d have been shown for clarity in FIG. 6.

In the present example, the remote braking control units 602a and 602b are part of the input and output interfaces 102, 114 and so provide the control outputs $O_1$ to $O_7$ to the valves 508, 512, 516, 518, 522, and 520. However, in other examples, the remote braking control units 602a and 602b may be separate from and communicatively coupled to the input and output interfaces 102, 114. In other words, the input interface 102 may be configured to receive inputs from avionic equipment in the braking control system. In such an example, the remote braking control units 602a and 602b provide the operating inputs $I_1$ to $I_9$ and receive the control outputs $O_1$ to $O_7$.

Figure 7:
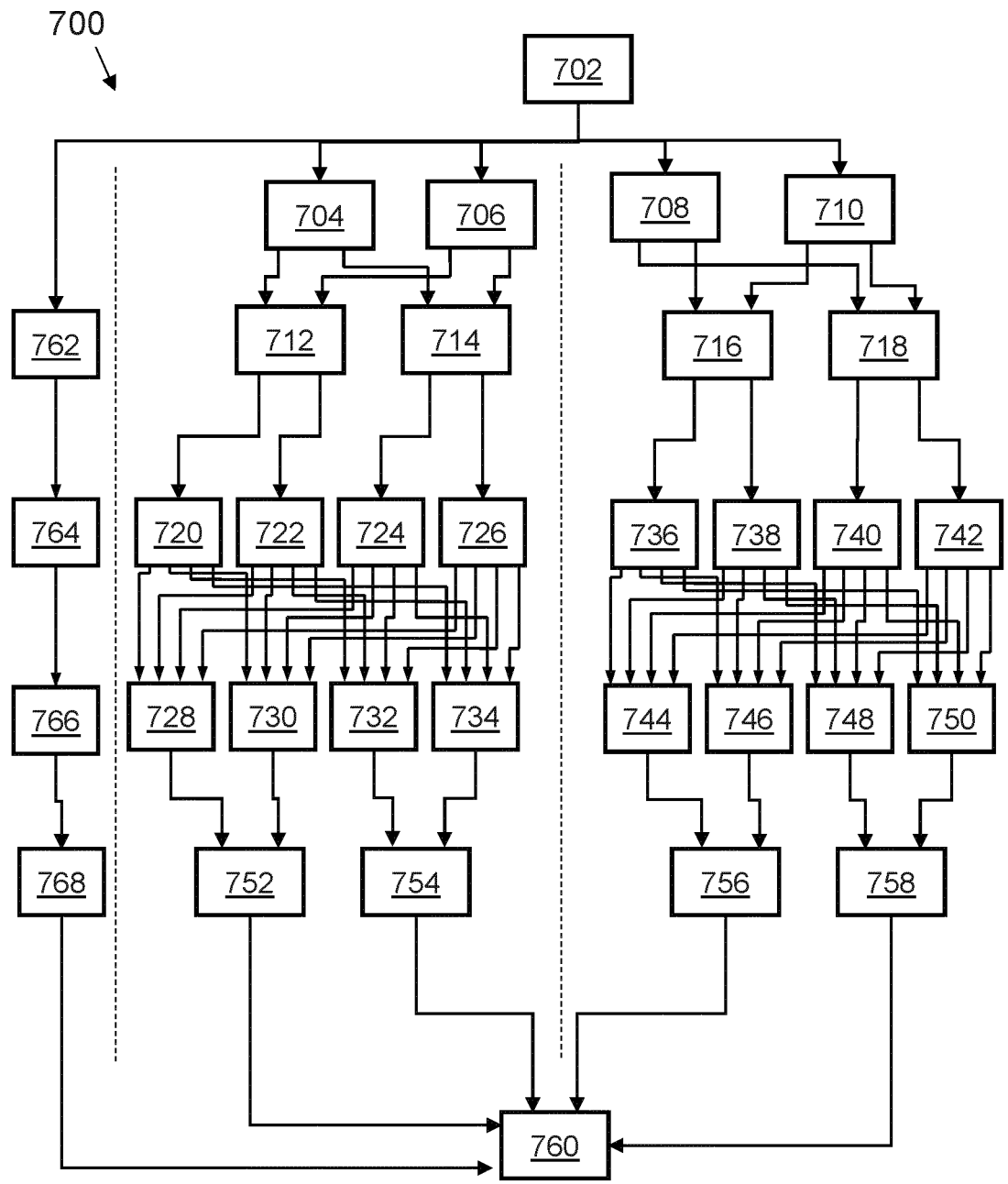
FIG. 7 is a schematic diagram of a graph model representing at least part of a braking control system according to an example.

FIG. 7 shows an example of a graph model 700 representing the avionic equipment and some physical actuation equipment in the braking control system. The graph model comprises a plurality of nodes 702 to 768 connected by a set of directed edges. Due to the relatively large number of components in the braking control system, and the plurality of ways in which the braking control system can operate, the graph model 700 does not simply represent an overview of the equipment in the braking control system and the relevant connections. Rather, the graph model 700 also represents potential operating procedures in the form of pathways from a first node 702 to an end node 760.

The graph model 700 comprises three sections separated in FIG. 7 by dashed vertical lines. The first section, located on the left and comprising nodes 762 to 768, represents an operating procedure where no brakes are applied. The second, middle section represents operating procedures for operating the brakes using the hydraulic pump 504 and the first remote braking control unit 602a. The third section, on the right, represents operating procedures for operating the brakes using the hydraulic pump 504 and the second remote braking control unit 602b. It will be appreciated that when generating training data according to examples described herein, the graph model which is likely to be used would also include the possibility of operating the brakes 502a and 502b using the hydraulic accumulator. There will be further operating procedures which are possible, beyond those shown here.

A first subset of nodes 704 to 718 and 752 to 758 represent operation of physical actuation equipment in the braking control system. Nodes 704 and 706 represent operation of the normal selector valve 508 using either a primary or secondary coil respectively. Nodes 712 and 714 represent operating the servo valve 518 using either a primary or secondary coil respectively.

Nodes 720 to 750 of a second subset of nodes represent a manner in which a brake is operated. The manner in which a brake is operated may include specifying avionic equipment used to operate said brake, operating the brake in an environmental compensation mode, such as an antiskid mode, and operating the brake not in an environmental compensation mode. In this example, node 720 represents operation of the first brake 502a using the first module 604a in an environmental compensation mode. Where the environmental compensation mode is an antiskid braking mode, the antiskid mode involves using feedback from the tachometer 528 to adjust the braking provided to the first brake 502a, so as to prevent skidding. Node 722, in contrast, represents operating the first brake 502a using the first module 604a, not in an environmental compensation mode. Nodes 724 and 726 represent similar functionality to nodes 720 and 722 respectively, except that they are operated using the second module 604b. Nodes 728 to 734 represent similar function to nodes 720 to 726 from which they follow but represent a manner of operation of the second brake 502b. Nodes 752 and 754 both represent operation of servo valve 520 but using either a primary or secondary coil respectively.

Nodes 708, 710, 716, 718, 736 to 750, 756, and 758 represent similar operations and functions as the nodes previously described. Nodes in corresponding positions in the second and third sections represent the same function except that the nodes 708, 710, 716, 718, 736 to 750, 756, and 758 are dependent on the operation of the second remote braking control unit 602b rather than the first remote braking control unit 602a.

Figure 8:
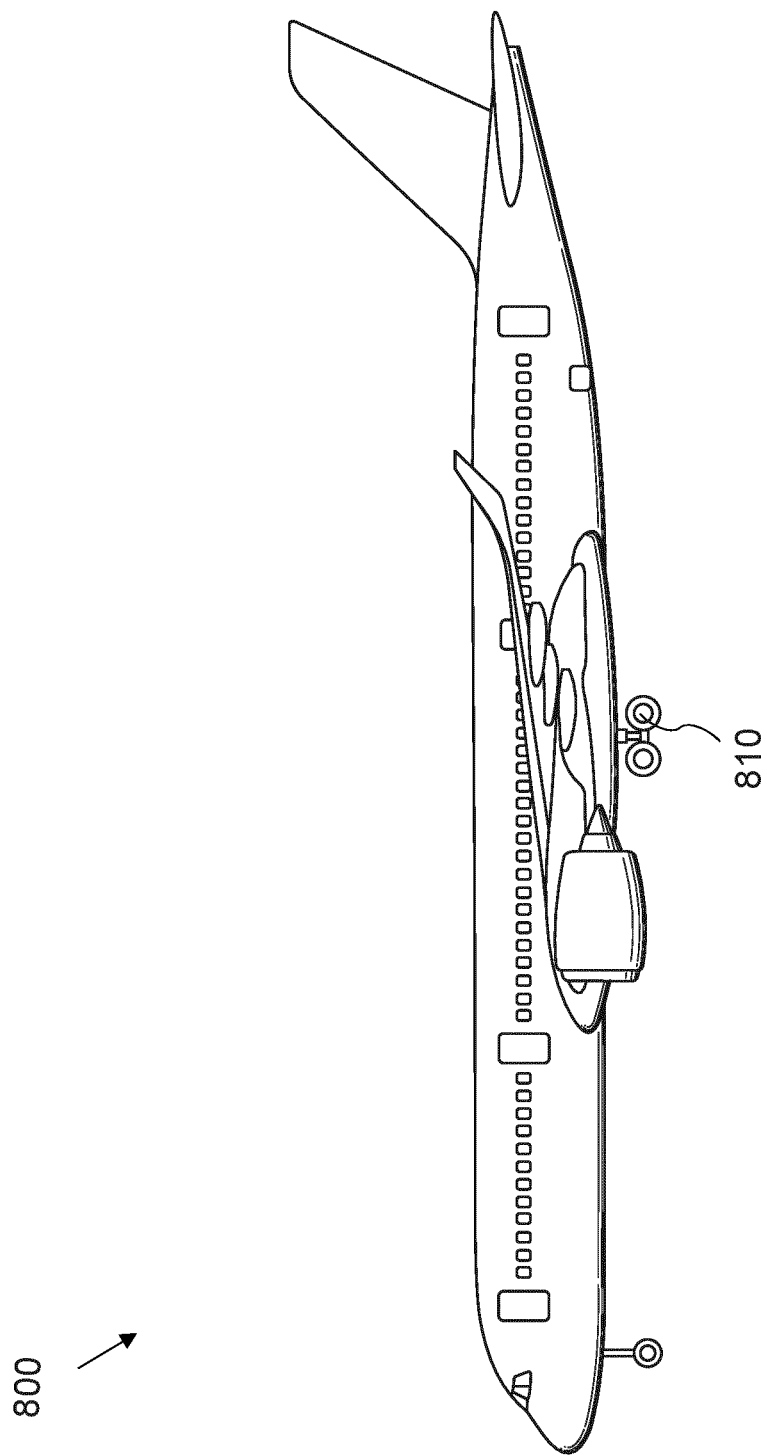
FIG. 8 is a schematic diagram of an aircraft according to an example.

FIG. 8 shows an aircraft 800 according to an example. The aircraft 8 comprises an aircraft control system as described in relation to any of FIGS. 1 to 7. In the present example, the aircraft 800 comprises a braking control system for operating the brakes 810 in the aircraft 800. The aircraft 800 comprises other aircraft control systems, having classifiers 110, such as environmental regulation systems, avionics systems, navigation systems, communication systems, flight control systems, and any other suitable systems in the aircraft 800. Alternatively, the aircraft 800 comprises a single aircraft control system, which is adapted to provide control outputs for a plurality of systems in the aircraft based on aircraft operating inputs using a classifier 110. This may allow, dependencies between different systems in the aircraft to identified and accurately handled.

Figure 9:
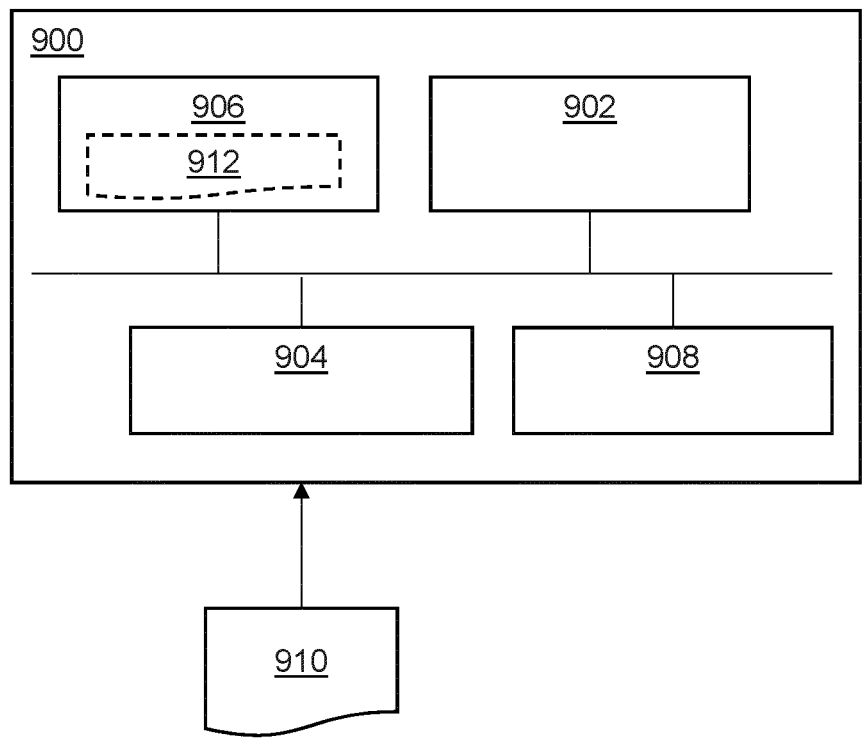
FIG. 9 is a block diagram illustrating a machine learning system according to an example.

In another example of the present disclosure, as shown in FIG. 9, there is provided a machine learning system 900 for training a classifier 110 of an aircraft control system 100. The machine learning system 900 is implemented using at least one processor and at least one memory comprising any suitable combination of volatile and non-volatile memory. The machine learning system may also comprise one or more user interfaces and data inputs such that a user can configure and/or operate the machine learning system 900 to achieve a desired result. The machine learning system 900 comprises an environment 902, a pathway evaluation engine 904, storage 906, and a training engine 908. The environment 902, pathway evaluation engine 904, and the training engine 908 are implemented as software modules in the machine learning system 900. The at least one memory comprises instructions which, when executed by the at least one processor, cause the at least one processor to implement the modules 902, 904, and 908.

The environment 902 comprises a graph model representing at least part of an aircraft, such as the graph model shown in and described with reference to FIG. 7. The pathway evaluation engine 904 is adapted to obtain data 910 representing at least one target outcome measure for a given scenario. The data 910 shown in FIG. 9 is received by the machine learning system 900, for example, as an input from a user via a user interface and/or by receiving the data 910 over a network interface. However, it will be appreciated that the data 910 may be stored in storage 906 and retrieved by the pathway evaluation engine 904.

The pathway evaluation engine 904 is then configured to select a pathway from the start node 702 to at least one end node 760 based on a comparison of at least one outcome measure determined for the selected pathway and the at least one target outcome measure. For example, where the aircraft control system 100 is a braking control system, the at least one target outcome measure includes a desired amount of braking force applied. The at least one target outcome measure may also include other variables, such as an amount of deceleration of the aircraft, a temperature value for one or more components in the brakes, and other suitable variables.

The pathway evaluation engine 904 is then configured to generate training data 912 representing a control policy f $\bar{\sigma}(V_n)$ for the given scenario based on the selected pathway. The training data 912 associates the selected operating procedure with the given scenario. Where the classifier 110 comprises a neural network, the given scenario is defined by one or more input variables $V_1$ to $V_3$ and these input variables are associated with specific output variables $V_4$ and $V_5$ which are to be produced by the classifier 110 to control the aircraft. This training data 912 is then stored in the storage 906 to be used for training the classifier 110 of the aircraft control system 100. Storing the training data 912 in the storage 906 allows a cumulative set of training data to be generated. In this way, as the systems develop and/or as more scenarios are determined and assessed, the set of training data can grow and so future classifiers 110 may be trained based on larger and more extensive data sets. The training engine 908 is adapted to train the classifier 110 of the aircraft control system using the training data 912 by updating and/or generating parameters $\theta_1$ to $\theta_n$.

In the present example, the plurality of scenarios which are used to generate training data 912 for training the classifier 110 to control the aircraft are representative of scenarios which are known to operators and developers of the aircraft. In this way, the training data 912 may be extensive and cover the general operation of the aircraft such that when the aircraft control system 100 is in operation it will react predictably under scenarios based on which it has been trained. Further, by selecting the operating procedure based on a comparison of at least one outcome measure and at least one target outcome measure rather than by manually determining an operating procedure, the machine learning system 900 may identify superior ways of controlling the aircraft. For example, due to increased efficiency, higher reliability, requiring the operation of fewer components, providing increased comfort, and other suitable variables.

In some cases, due to the complexity of the environment 902 which represents the at least part of an aircraft, a large number of pathways may need to be evaluated before a suitable one can be selected. The number of pathways which may be generated before a suitable one is found may be prohibitively high and hence may be infeasible based on available computing power. In this case it is desired to determine pathways more efficiently so as to converge on a suitable pathway more quickly.

To this end, selecting a pathway may involve a multistage process. A first plurality of pathways from the start node 702 to at least one end node 760 are generated. This involves using the pathway evaluation engine 904 to randomly select routes in the graph model 700. The number of pathways in the first plurality will be dependent on the at least part of an aircraft which is being modelled and on the computing power available to the machine learning system 900. A second plurality of pathways are then evaluated from the start node 702 to at least one end node 760. Evaluating the second plurality of pathways involves generating the second plurality of pathways and determining respective outcome measures. The second plurality of pathways are generated based on a selected subset of the first plurality of pathways. A pathway is then selected from the second plurality of pathways based on a comparison of at least one outcome measure determined for the selected pathway and the target outcome measure, or a comparison of a plurality of outcome measures and target outcome measures.

By generating the second plurality of pathways based on a selected subset of the first plurality of pathways it may be possible to exclude and not re-simulate pathways which relate to non-viable operating procedures. The subset of the first plurality of operating procedures are selected based on a comparison of outcome measures determined for the first plurality of pathways with the at least one target outcome measure.

In the specific example of a braking control system as shown in FIGS. 5, 6 and 7, a first plurality of pathways may be generated from node 702 to 760. Consider a scenario in which the first remote braking control unit 602a develops a fault and a user input instructing the braking control system to apply braking is received. The first plurality of pathways might include the four pathways $P_1$ to $P_4$ which traverse the nodes as indicated below:

$P_1$=[702, 704, 712, 722, 732, 754, 760]

$P_2$=[702, 706, 714, 726, 732, 754, 760]

$P_3$=[702, 708, 716, 738, 746, 756, 760]

$P_4$=[702, 710, 718, 740, 750, 758, 760]

Based on a comparison of an amount of braking resultant from operating procedures $P_1$ to $P_4$ with a target amount of braking, it may be identified that pathways $P_1$ and $P_2$ are unsuitable as they rely on remote braking control unit 602a.

The pathway evaluation engine 904 may then generate a second plurality of pathways which are based on the pathways, $P_3$ and $P_4$. Consequently, the second plurality of pathways which are generated may include the pathways outlined below:

$P_5$=[702, 708, 716, 736, 744, 756, 760]

$P_6$=[702, 710, 718, 738, 748, 758, 760]

$P_7$=[702, 708, 718, 740, 746, 758, 760]

$P_8$=[702, 710, 716, 742, 750, 756, 760]

This second plurality of pathways have been generated based on the subset of the first plurality of pathways $P_3$, $P_4$ and so includes operating procedures which rely on the operation of the second remote braking control unit 602b which is functional in this scenario. In this way, the evaluation of pathways may converge on solutions which are more promising while preventing the machine learning system 900 from continuing to evaluate pathways which provide poor results and are unlikely to contain rewards. This increases the scalability and applicability of the machine learning system to classifiers 110 in aircraft control systems 100 which are adapted to control complex modern aircraft.

It will be appreciated that the example of the first and second pluralities of pathways described above are relatively small samples and that pluralities of pathways may each involve hundreds or even thousands of pathways.

When generating the second plurality of pathways, it is desired to identify and evaluate pathways which provide high rewards with respect to the at least one target outcome measure. In order to accomplish this, diversity may be introduced into the second plurality of pathways when they are generated. Metaheuristic optimization algorithms are used in order to increase the diversity in subsequent pluralities of pathways. These algorithms may involve stages of selection, reproduction, mutation, and recombination. Pathways from the first plurality of pathways may be selected based on their results. These selected pathways may then be combined and mutated according to techniques in evolutionary computing. These are then used in generating the second plurality of pathways. Metaheuristic optimization algorithms may be used in conjunction with suitable search algorithms, for example Monte Carlo Tree Search.

In some example, these metaheuristic optimization algorithms may also include selecting some pathways which do not receive large rewards (based on outcome measures), but which can be used to increase the diversity in the subsequent plurality of pathways. The processes described above may be iteratively repeated, for example generating a third plurality from the second, and fourth plurality from the third and so on. After many iterations, the highest ranked pathways, based on outcome measures, may be selected for use in generating the training data.

Figure 10:
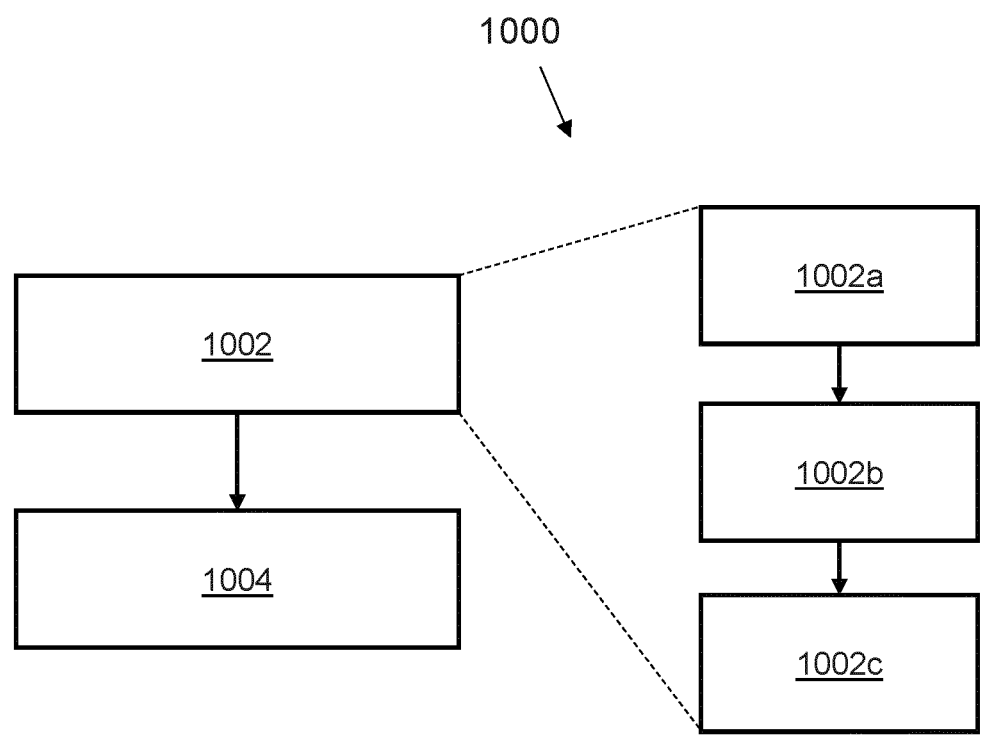
FIG. 10 is a flow diagram of a method of training a classifier according to an example.

A method corresponding to the function of the machine learning system 900 is also provided and illustrated in FIG. 10 by a flow diagram 1000. At a first block 1002, the method for training a classifier 110 of an aircraft control system 100 comprises generating training data 912 representing a control policy $f_{\bar{\theta}}(V_n)$ for a plurality of scenarios. At block 1004 the method comprises training the classifier 110 of the aircraft control system 100 to generate output control data 112 according to the control policy $f_{\bar{\theta}}(V_n)$ using input data 104 representing an operating state of the aircraft 800.

A process for generating the training data for each scenario is illustrated as a series of sub steps illustrated by blocks 1002a to 1002c. At block 1002a, at least part of the aircraft 800 is represented using a graph model 400 comprising a plurality of nodes 402a to 402s and a set of directed edges 404a to 404u connecting the plurality of nodes 402a to 402s. The plurality of nodes 402a to 402 comprises a start node 402a and at least one end node 402n to 402s.

At block 1002b, data 910 representing at least one target outcome measure for the scenario is obtained, for example, being received over a network interface, retrieved from storage, or specified by a user through a user interface.

At block 1002c, a pathway in the graph model 400 is selected from the start node to at least one end node 402n to 402s is selected. The selection is based on a comparison of at least one outcome measure determined for the selected pathway and at least one target outcome measure. The pathway which is selected represents an operating procedure for the aircraft control system 100.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. It is to be noted that the term "or" as used herein is to be interpreted to mean "and/or", unless expressly stated otherwise.

The invention claimed is:

1. An aircraft control system comprising:
    an input interface adapted to receive aircraft operating inputs and generate input data representing an operating state of an aircraft;
    a processing engine comprising a classifier having a plurality of parameters adapted to represent a control policy for operating the aircraft, the processing engine arranged to apply the input data to the classifier to generate control output data, wherein the control policy represents a desired operation of the aircraft under a plurality of scenarios and the parameters are generated based on training data representing the control policy for each of the plurality of scenarios; and
    an output interface adapted to generate control outputs from the control output data to control the aircraft,
    wherein the training data is generated by selecting an operating procedure for the aircraft control system for each of the plurality of scenarios by:
        determining a target outcome measure for the scenario;
        generating a plurality of operating procedures for the scenario based on an environment representing at least part of the aircraft, wherein the environment includes:
            a graph model representing the at least part of the aircraft, the graph model comprising:
                a plurality of nodes including a start node and at least one end node, and
                a set of directed edges connecting the plurality of nodes,
            wherein the plurality of operating procedures are generated by determining pathways in the graph model from the start node to the at least one end node;
        determining outcome measures based on the plurality of operating procedures; and
        selecting an operating procedure from the plurality of operating procedures based on a comparison of the target outcome measure and with the outcome measures.

2. The aircraft control system according to claim 1, wherein the aircraft operating inputs comprise signals from at least one of sensor outputs and user inputs associated with an operating state of the aircraft.

3. The aircraft control system according to claim 1, wherein the environment representing the at least part of an aircraft is dependent on the said scenario.

4. The aircraft control system according to claim 1, wherein the plurality of nodes comprises a first subset of the nodes, wherein each node in the first subset representing a piece of equipment being operated in the least part of an aircraft, and a second subset of the nodes, wherein each node in the second subset representing a manner in which a piece of equipment is operated in the at least part of an aircraft.

5. The aircraft control system according to claim 1, wherein the selecting an operating procedure based at least on a comparison of the target outcome measure with the outcome measures comprises:
    selecting a subset of the operating procedures based on the comparison of the target outcome measure with the outcome measures;
    generating additional operating procedures based on the subset of the operating procedures;
    determining additional outcome measures from the additional operating procedures; and
    selecting one of the additional an operating procedure based on a comparison of the target outcome measure with the additional outcome measures.

6. The aircraft control system according to claim 1, wherein the aircraft control system is a braking control system.

7. The aircraft control system according to claim 4, wherein the aircraft control system is a braking control system and the graph model represents actuation equipment and avionic equipment in the braking control system.

8. The aircraft control system according to claim 7, wherein the nodes in the first subset of the nodes each represent operation of actuation equipment in the braking control system.

9. The aircraft control system according to claim 7, wherein at least one node in the second subset of the nodes represent a manner in which a brake is operated.

10. The aircraft control system according to claim 9, wherein the manner in which the brake is operated includes one or more of:
    specifying avionic equipment used to operate said brake;
    operating the brake in an environmental compensation mode; or
    operating the brake not in an environmental compensation mode.

11. The aircraft control system according to claim 6, wherein the input interface is configured to receive inputs from one or more of:
    a power supply for operating the brake;
    at least one of a plurality of coils used to operate respective components for actuation equipment in the braking control system;
    a pressure sensor in the braking control system;
    avionic equipment in the braking control system; or
    a wheel speed sensor for monitoring braking.

12. A machine learning system for training a classifier of an aircraft control system, the machine learning system comprising:
    an environment comprising a graph model representing at least part of an aircraft, the graph model having a plurality of nodes and a set of directed edges connecting the plurality of nodes, the plurality of nodes including a start node and at least one end node; and
    a pathway evaluation engine adapted to:
        obtain data representing at least one target outcome measure for a given scenario;
        generate a plurality of pathways from the start node to at least one end node for the given scenario;
        determine outcome measures based on the plurality of pathways;

select a pathway of the plurality of pathways based at least on a comparison of the target outcome measure with the outcome measures; and generate training data representing a control policy for the given scenario based on the selected pathway;

storage for storing the training data to be used to train a classifier of an aircraft control system; and a training engine adapted to train the classifier of the aircraft control system using the training data to generate control output data according to the control policy using input data representing an operating state of an aircraft.

13. The machine learning system according to claim 12, wherein selecting the pathway comprises:

evaluating a further plurality of the pathways from the start node to at least one end node, wherein the further plurality of the pathways are generated based on a selected subset of the plurality of the pathways; and selecting a pathway from the further plurality of pathways based on a comparison of at least one outcome measure determined for the selected pathway and the at least one target outcome measure.

14. The machine learning system according to claim 13, wherein the selected subset of the plurality of the pathways are selected based on a comparison of outcome measures determined for the plurality of the pathways with the at least one target outcome measure.

15. An aircraft comprising the aircraft control system in claim 1.

16. A method for training a classifier of an aircraft control system, the method comprising:

generating training data representing a control policy for a plurality of scenarios; and training a classifier of the aircraft control system to generate control output data according to the control policy using input data representing an operating state of an aircraft;

wherein generating training data comprises, for each of the plurality of scenarios:

representing at least part of an aircraft using a graph model comprising a plurality of nodes and a set of directed edges connecting the plurality of nodes, the plurality of nodes comprising a start node and at least one end node;

obtaining data representing at least one target outcome measure for the scenario;

generating a plurality of pathways from the start node to the at least one end node for the plurality of scenarios;

determining outcome measures based on the plurality of pathways; and selecting a pathway of the plurality of pathways based on a comparison of the at least one target outcome measure with the outcome measures.

* * * * *